(12) United States Patent
Furlong et al.

(10) Patent No.: US 7,957,390 B2
(45) Date of Patent: Jun. 7, 2011

(54) DETECTION OF SIGNATURES IN DISORDERED MESSAGE SEGMENTS

(75) Inventors: Peter Furlong, Dublin (IE); Daniel Martin O'Keeffe, Dublin (IE); Eoghan Stack, Ballyvolane (IE); Kevin Loughran, Castleblaney (IE)

(73) Assignee: Hewlett-Packard Company, Palo Alto, CA (US)

( * ) Notice: Subject to any disclaimer, the term of this patent is extended or adjusted under 35 U.S.C. 154(b) by 745 days.

(21) Appl. No.: 11/133,039

(22) Filed: May 18, 2005

(65) Prior Publication Data

US 2006/0227787 A1  Oct. 12, 2006

(30) Foreign Application Priority Data

Apr. 8, 2005  (GB) .................................. 0507143.6

(51) Int. Cl.
  *H04L 12/28*  (2006.01)
  *G06F 11/00*  (2006.01)
(52) U.S. Cl. ......................................... 370/394; 726/23
(58) Field of Classification Search .................... 370/394
  See application file for complete search history.

(56) References Cited

U.S. PATENT DOCUMENTS

| 6,487,689 B1 * | 11/2002 | Chuah ............................ 714/748 |
| 2004/0174820 A1 * | 9/2004 | Ricciulli ......................... 370/245 |
| 2005/0025152 A1 * | 2/2005 | Georgiou et al. ............. 370/394 |
| 2006/0077979 A1 * | 4/2006 | Dubrovsky et al. ........... 370/394 |
| 2006/0224589 A1 * | 10/2006 | Rowney et al. .................... 707/9 |

FOREIGN PATENT DOCUMENTS

WO  WO 02/101516  12/2002

OTHER PUBLICATIONS

Search Report from counterpart GB application No. 0507143.6.

* cited by examiner

*Primary Examiner* — Daniel J Ryman
*Assistant Examiner* — John Blanton

(57) ABSTRACT

A method of detecting signatures in message segments comprises employing a state machine for the detection of character strings in the message segments. The state machine executes for each input character a transition determined by a current state of the machine and a current input character. The message segments conform to TCP or other ordering transport protocol. The order of arrival of the message segments is monitored. In the event that an intermediate message segment is missing between a processed segment and an immediately subsequent message segment, the current state of said state machine at the end of the said processed segment is stored. The machine is restarted from its null or datum state for the examination of the immediately subsequent message segment, which is then temporarily stored. When the missing segment eventually arrives, it and the stored segment are successively examined for signatures by means of the state machine, beginning at the stored state. The invention allows for examination of overlapping signatures without requiring re-assembly of the segments or substantial buffering.

17 Claims, 4 Drawing Sheets

| Current State | Input | Next State | Default State | Pattern detected to this point | State Count |
|---|---|---|---|---|---|
| 0 | a | 1 | 0 | a | 1 |
| 0 | d | 2 | 0 | d | 2 |
| 1 | b | 3 | 0 | ab | 3 |
| 1 | a | 1 | 0 | | 4 |
| 1 | d | 2 | 0 | | 5 |
| 2 | e | 4 | 0 | de | 6 |
| 2 | a | 1 | 0 | | 7 |
| 2 | d | 2 | 0 | | 8 |
| 3 | c | 5 | 0 | abc | 9 |
| 3 | a | 1 | 0 | | 10 |
| 3 | d | 2 | 0 | | 11 |
| 4 | f | 6 | 0 | def | 12 |
| 4 | a | 1 | 0 | | 13 |
| 4 | d | 2 | 0 | | 14 |
| 5 | a | 1 | 0 | | 15 |
| 5 | d | 2 | 0 | | 16 |
| 6 | a | 1 | 0 | | 17 |
| 6 | d | 2 | 0 | | 18 |

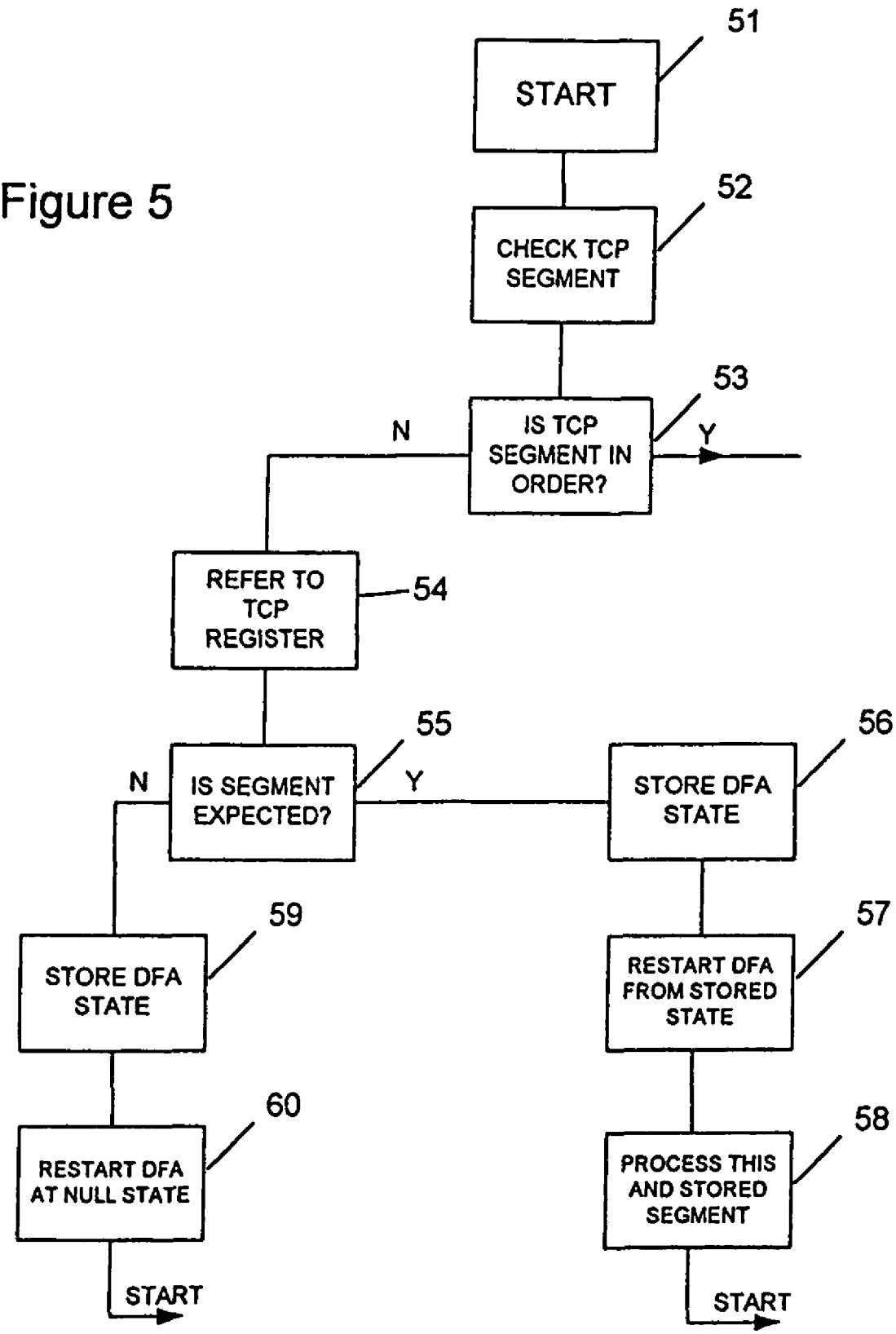

US 7,957,390 B2

DETECTION OF SIGNATURES IN DISORDERED MESSAGE SEGMENTS

FIELD OF THE INVENTION

This invention relates to the detection of digital signatures in signal traffic composed of discrete message segments and particularly to the detection of signatures while the segments of a message are disordered.

BACKGROUND TO THE INVENTION

The successful transmission of messages over a packet-based network is dependent on a multiplicity of different protocols which prescribe formats for message segments, datagrams and packets in successive layers of encapsulation. For present purposes it is necessary to mention only the link layer, the network layer and the transport layer.

The link layer, or media access control layer, governs the transmission of a packet from one device to another in accordance with the link layer addressing of the devices or network cards that a packet will encounter on its route between source and destination.

A network layer protocol, of which the most common example is IP (internet protocol), provides for proper addressing of source and destination hosts for message segments that travel between different networks. It does not provide any delivery mechanism or guarantee of delivery.

A 'transport layer' protocol provides logical communication between processes running on different hosts (i.e. source host and destination host). A common transport layer protocol such as TCP (Transmission Control Protocol) provides for such logical communication and a reliable data transfer service in the sense that it ensures ultimately that successive segments of a message are assembled at a destination host in a complete and correct order. The invention will be described in terms of TCP but the invention may be applied to message segments conforming to any other protocol, herein called 'ordering transport protocol', that enables identification and correction of the order in which message segments have been received.

A desirable feature in network communication is the prevention or detection of unwanted intrusion by means of the detection of digital signatures. Such signatures may consist of a succession of characters (e.g. ASCII characters) varying from a few tens of characters to many hundreds of characters. A common technique for the detection of digital signature is the use of a state machine, e.g. a DFA (deterministic finite-state automaton), which defines each of a multiplicity of signatures as a respective succession of states. The states may each be represented by one or more locations in memory and a transition may be represented by a pointer which is accessed using the current state and a respective input character; each state may therefore comprise a plurality of locations each including a respective character and a respective pointer.

In current practice, it is necessary to reassemble the TCP segments in a correct order to ensure that the DFA can check for signatures that transcend boundaries between segments.

Currently therefore, if a TCP segment is missing from a sequence, the DFA is halted and the state thereof is stored. Subsequent segments that arrive in the same traffic flow have to be buffered until the missing segment arrives. Then the DFA is reloaded with the stored state and processing of the traffic flow continues. Such buffering, which may need to accommodate a large number of message segments that may be received while a segment is missing, is inconvenient and provision for it represents an undesirable overhead.

SUMMARY OF THE INVENTION

The present invention provides in its preferred form for the storage of the state of the state machine when a segment is missing. However, it allows for the processing of the subsequent segments with a null or datum state of the state machine. This will ensure that these segments are checked for signatures. The first, immediately subsequent, segment should be buffered so as to allow for the checking for signatures which may overlap from the missing segment. The segments after the first subsequent segment can be processed and then forwarded or discarded, because they are no longer required for the checking for signatures; this substantially reduces the buffering required.

Further features of the invention will become apparent from the following description with reference to the drawings.

BRIEF DESCRIPTION OF THE DRAWINGS

FIG. 5 is a flow diagram illustrating the relationship between the checking of the message segments and the control of the DFA according to the invention.

DETAILED DESCRIPTION

Figure 3:
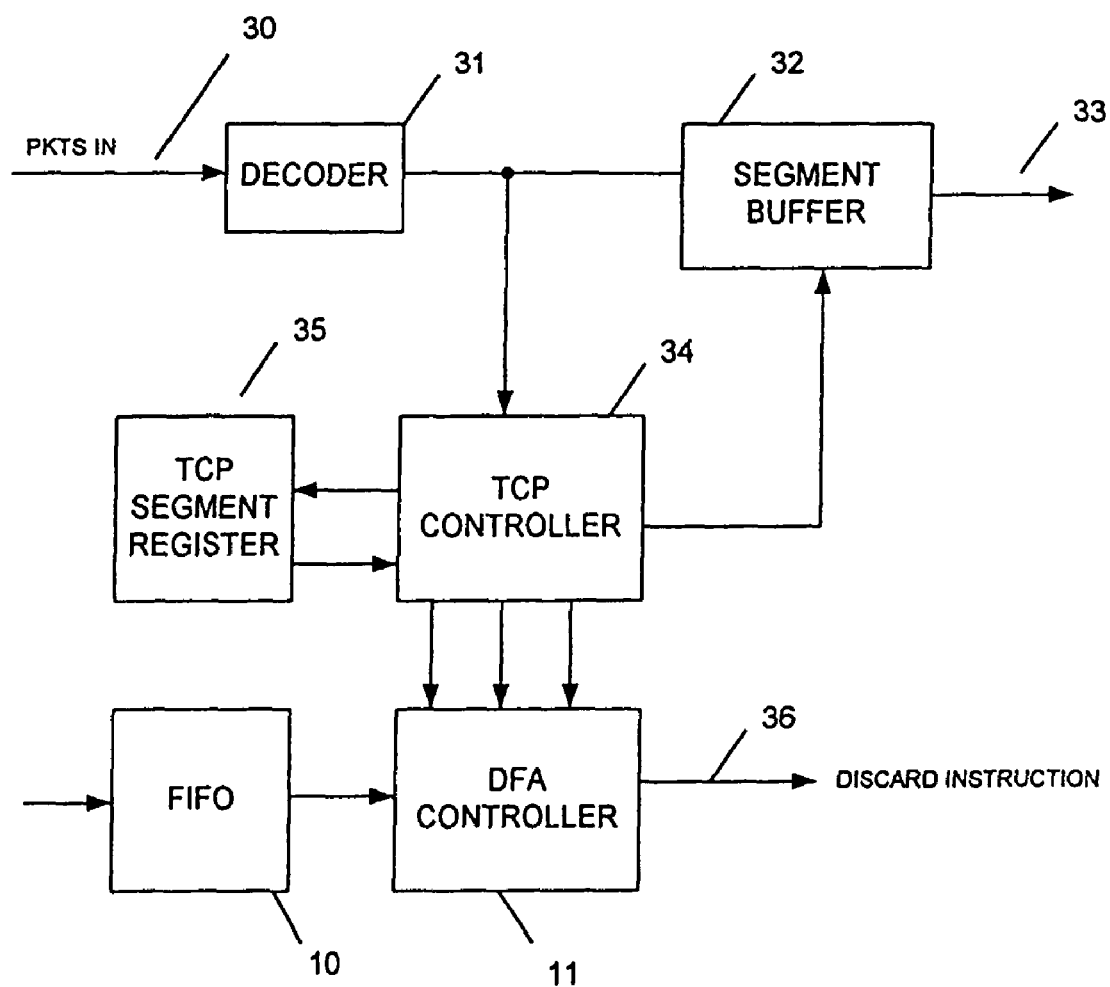
FIG. 3 is a schematic diagram of one embodiment of the invention.

An embodiment of the invention is schematically shown in FIG. 3. However, before an embodiment of the invention is described, it is convenient first to discuss FIGS. 1 and 2, which illustrate a DFA with features appropriate for incorporating the DFA in an embodiment of the invention.

A DFA can be regarded as a graphical tree extending from a datum or null point and defining a multiplicity of sequences of states each of which can correspond to a sequence of characters, such as ASCII characters that represent a signature. Although there are various forms of a DFA, and it is not intended to limit the invention to any one of them, very typically the characters representing the input traffic are successively loaded into a FIFO 10 and examined each in turn by a DFA controller 11 which has recourse to a DFA memory 12. For each character there has to be a determination of the current state of the DFA, which state may be held in a current state register 13, and with recourse to the memory 12, and the input character, a determination of the next state. The remaining features of FIG. 1 will be explained below.

Figures 1, 2:
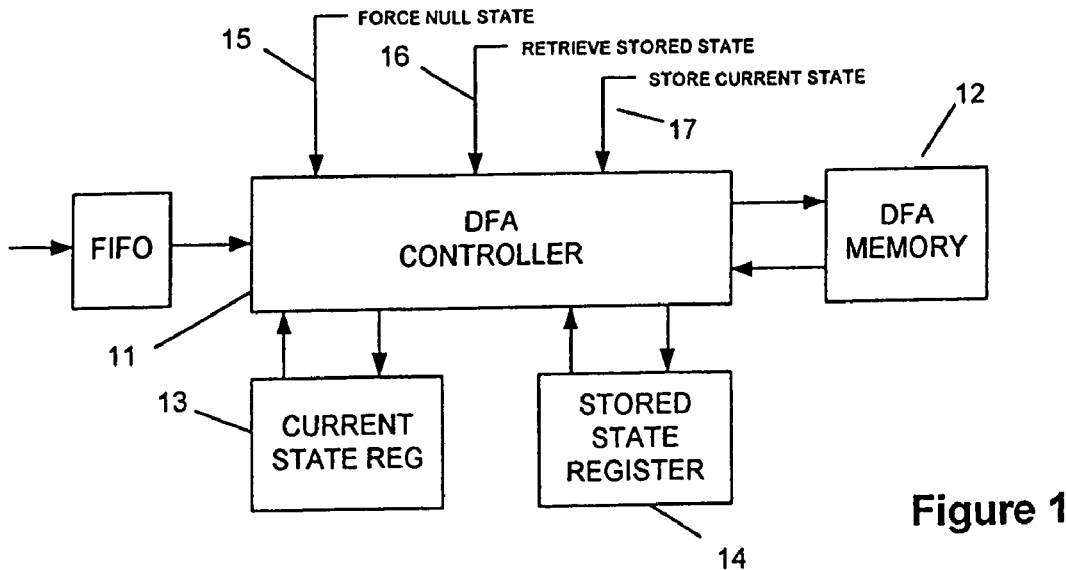
FIG. 1 is a schematic diagram of a deterministic finite state machine for use in the present invention.
FIG. 2 shows a memory with entries defining the states and transitions of a simple example of a deterministic finite state machine.

FIG. 2 illustrates in its first three columns a set of entries which in essence define the DFA graph. The particular DFA represented by FIG. 2 is intended to detect either the succession of characters 'abc' or the succession of characters 'def'. If the current state of the state machine is the default state (0), and the next input is 'a', the next state defined is state 1, as shown in the 'Next State' column. If the current state is 0 and the input is 'd' then the machine will transition to state '2', as also shown in the 'next State' column. Thus the memory entries, shown as state counts 1 and 2 in the right hand column, define the states and the transitions between states. The column entitled 'pattern detected to this point' shows that for example on executing the transition from state 1 to state 2, the 'pattern thus far detected (in this case only the character 'a'. If the machine is in state '0' and an input character in this example is other than 'a' or 'd' then the machine reverts to the 'null' or default state.

Now let us suppose that the state machine is in state '1' and the next input is character 'b'. The machine will transition to state 3. If the machine in state 3 then receives the input 'c' the machine transitions to state 5 and has detected the pattern or signature 'abc', as noted in the respective column for state count 9.

Likewise, if the state machine makes the transitions via states 0, 2, 4 and 6 in that order it has detected the signature 'def'.

The particular state machine will detect not only 'abc' but will also detect certain intermediate sequences. For example if the machine is in state '4' and the input character is now 'a', the machine transitions to state '1', see state count line 13.

Other ways of organizing the state machine and therefore the entries in memory are feasible. One example of compressing the memory space required is described in copending U.S. patent application for Furlong et al, Ser. No. 11/064,257 filed 22 Feb. 2005 and commonly assigned herewith.

In practice, a DFA has many more states and transitions than are shown in FIG. 2. Typically the state machine needs to be capable of detecting several hundreds of signatures any of which might be a few tens or possibly hundreds of characters in length.

Thus, as so far described, the controller 11 will have recourse to a current state of the machine (indicated for convenience as the content of a current sate register 13), which will be obtained when the DFA transitions to its 'next state', as described above. When the DFA controller examines the next input character it will have recourse to the memory to determine from the current state and the input character what the next state should be, and so on.

The DFA shown in FIG. 1 has an additional 'register' (however defined in hardware of software) and three commands. Command 15 is a 'force null state'. Command 16 is a 'retrieve stored state' and command 17 is 'store current state'. The significance of the stored state and of the commands 15, 16 and 17 will become apparent from later description.

FIG. 3 shows in simplified form part of a network unit which receives packets, decodes them to recover message segments, in this example TCP message segments, and eventually, subject to a security check performed by the DFA, passes the message segments on for further processing or transmission in a manner not relevant to the present invention.

As is well known by those skilled in the art, the transmission control protocol (TCP) is a mechanism by which messages from source host to destination host can be checked for their completeness and their correct order. After an input packet is decoded by a decoder 31 they may be directed to a segment buffer 32 while the characters are checked, there being an output 33 from the buffer 32 to the FIFO 10. On the assumption that the security check does not indicate that the message should be discarded, the segment may be removed form the buffer, for example for onward transmission. Except in one circumstance it is not necessary to retain in buffer 32 a segment after security processing of that segment. The checking of the TCP segments is shown as performed by a TCP controller 34 which has to check the TCP segments to determine whether they had been received in correct order. It may employ a TCP segment register 35 or any equivalent means to keep track of the reception of the segments and the order in which they have been received. If on examination of a TCP segment it is the correctly numbered segment, then it is allowed to proceed. If however there is a break in the sequence, then as described below a single TCP segment must be retained in the TCP buffer until a missing segment is received.

It needs to be said at this point that if the segments were to be completely reassembled in correct order, as would be necessary at a destination host, or if reassembly were performed before a check for signatures is made, the capacity of the buffer 32 has to be substantial, i.e. to accommodate a possible worst case for disordering of the segments. However, the present invention allows a check for signatures to be made on possibly disordered segments without requiring reassembly and corresponding buffering capacity.

Figure 4:
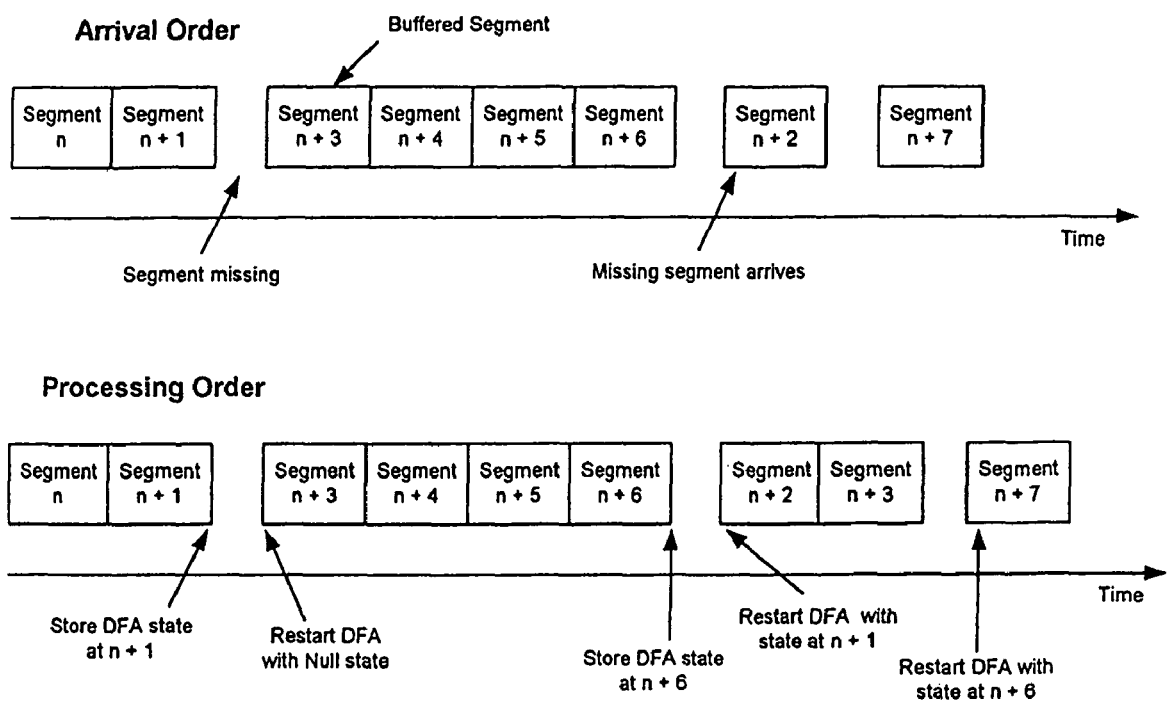
FIG. 4 illustrates an example of the arrival and processing of message segments.

Reference should now be made to FIG. 4, which shows one example of a sequence of TCP segments of which a segment is out of order. The upper part of FIG. 4 shows the arrival of succession of TCP segments in their temporal order. The first segments are numbered according to their correct order in the original message. The original and correct order is n, n+1, n+2, n+3 and so on. In the example shown segments n and n+1 are received correctly but segment n+2 is (temporarily) missing from the sequence. Segments n+3 to n+6 are received and then segment n+2, followed by segment n+7.

As noted above, if reassembly of segments is required before a check for signatures, it would be necessary, in this simple example, to hold the state of the state machine after segment n+1, to store segments n+3 to n+6 in a buffer, then to resume operation of the state machine for segment n+2. The present invention in this particular example will require only the retention after processing of segment n+3.

The lower part of FIG. 4 shows the order of processing of the segments for an arrival order as shown in the upper part of FIG. 4.

Since the segment n+2 is missing from the sequence, the absence of this segment is detected by the TCP controller with recourse to the TCP segment register 35 (FIG. 3). The TCP controller now produces command 17, which forces the storage (e.g. in register 13) the current state of the sate machine.

As shown, the next segment to arrive is segment n+3. In practice the arrival of segment n+3 is the indication that intermediate segment n+2 is missing, by reference to the relevant fields in the TCP header. The TCP controller, in addition to causing the storage of the current state of the state machine, forces by means of command 15 the state machine to the null or datum state, so that the state machine is restarted from this state for the examination of segment n+3. The TCP controller will cause the buffering of the segment n+3 only, as shown in the upper part of FIG. 4. Examination for signatures will now proceed for that immediately subsequent segment n+3 and those that follow until, in the example after segment n+6, the missing intermediate segment (n+2) is detected. At this point, TCP controller stores the current state of the state machine, i.e. the state at the end of segment n+6 in the example. The TCP controller will now restart the examination by the DFA from the previously stored state and will retrieve the single buffered segment (n+3) for processing after the missing segment (n+2). Thereafter the state machine will be restarted at the stored state current at the end of segment n+6, i.e. the last segment to be regularly processed before the missing segment arrived.

The buffering of the first segment that immediately follows in the original order the missing intermediate segment, in this example the buffering of segment (n+3) is required in order to check for signatures which may overlap from the missing segment (n+2) into the buffered segment (n+3). The segments after segment (n+3) can be processed normally and then discarded because processing on these is complete and they are no longer required. This will substantially reduce the amount of buffering in the system.

The process is summarised in FIG. 5. From a start 51 there has to be a check 52 of the TCP segment, and particularly whether it is in a correctly ordered sequence, decision 53. If the TCP segment is in proper order then no special action is required, other than the normal processing of the segment and a return to the start 51. If the TCP segment is not in order then reference (54) may be made to the TCP register to determine whether it is a previously missing segment, as for example segment n+2 in the example shown in FIG. 4. If the segment is a missing one that is awaited, then the DFA state will be stored, stage 56, and the DFA restarted from the stored state, stage 57. This segment and the previously stored segment are processed, stage 58. If the segment is not awaited, i.e. it a newly missing segment, then the DFA state must be stored (stage 59) and the segment buffered; the DFA is restarted (stage 60) at the null state.

In principle the technique may be applied to the possibility that a multiplicity of segments may be missing at any one time and that a belatedly arriving segment is not the earliest of the missing segments. It would be necessary to store a plurality of segments, each one being the segment immediately subsequent in the original order to a respective missing segment. It is easy to identify from their sequence numbers which stored segment follows a missing segment.

What is claimed is:

1. A method of detecting digital signatures in messages transmitted over a packet based network, said messages being composed of message segments having a predefined order, said method comprising:
    processing a first received message segment using a deterministic finite state automaton (DFA) operating on a network unit, said DFA defining each of a plurality of digital signatures associated with unwanted intrusion as a respective succession of states;
    storing a first state of the DFA after processing the first received message segment and forwarding the first received message segment;
    receiving a third message segment out of the predefined order;
    processing the third message segment using the DFA starting at a null state;
    receiving a second message segment following processing of the third message segment, wherein the second message segment is a next message segment in the predefined order following the first received message, wherein the third message segment is a next message segment in the predefined order following the second received message; and
    processing the second message segment using the DFA starting at the stored first state.

2. The method of claim 1, further comprising:
    storing the third message segment; and
    storing a second state of the DFA after processing the third message segment.

3. The method of claim 2, further comprising:
    in response to a determination that no digital signature is detected in the second message segment and the stored third message segment,
    storing a third state of the DFA for subsequent use after the processing of the second message segment and the stored third message segment.

4. The method of claim 2, further comprising:
    receiving a fourth message segment prior to receiving the second message segment, wherein the fourth message segment follows the third message segment in the predefined order; and
    processing the fourth message segment using the DFA starting at the second state.

5. The method of claim 4, wherein processing the fourth message segment further comprises processing the fourth message segment without storing the fourth message segment in a buffer.

6. The method of claim 4, further comprising:
    storing a fourth state of the DFA after processing the fourth message segment.

7. The method of claim 6, further comprising:
    receiving a fifth message segment following processing of the second message segment and the third message segment, wherein the fifth message segment follows the fourth message segment in the predefined order; and
    processing the fifth message segment using the DFA starting at the fourth state.

8. The method of claim 1, wherein the message segments conform to an ordering transport protocol.

9. The method of claim 1, further comprising:
    discarding a message associated with the received message segments if one of the plurality of digital signatures is detected by the DFA in at least one of the second message segment and the third message segment.

10. A network unit for detecting digital signatures in messages transmitted over a packet based network, said messages being composed of message segments having predefined order, said network unit comprising:
    a deterministic finite state automaton (DFA) operating on the network unit, said DFA defining each of a plurality of digital signatures associated with unwanted intrusion as a respective succession of states; and
    a controller configured to process a first received message segment using the DFA, to store a first state of the DFA after the first received message segment has been processed, wherein the controller is further configured to receive a third message segment out of the predefined order, to process the third message segment using the DFA at a null state, to receive a second message segment following processing of the third message segment, wherein the second message segment is a next message segment in the predefined order following the first received message, wherein the third message segment is a next message segment in the predefined order following the second received message, and to process the second message segment using the DFA starting at the stored first state.

11. The network unit of claim 10, further comprising:
    a buffer, wherein the controller is further configured to store the third message segment in the buffer and to store a second state of the DFA after processing the third message segment.

12. The network unit of claim 11, wherein, in response to a determination that no digital signature is detected in the second message segment and the stored third message segment, the controller is further configured to store a third state of the DFA for subsequent use after the processing of the second message segment and the stored third message segment.

13. The network unit of claim 11, wherein the controller is further configured to receive a fourth message segment prior to receiving the second message segment, wherein the fourth message segment follows the third message segment in the predefined order, and to process the fourth message segment using the DFA starting at the second state.

14. The network unit of claim 13, wherein the controller is further configured to process the fourth message segment without storing the fourth message segment in the buffer.

15. The network unit of claim 13, wherein the controller is further configured to store a fourth state of the DFA after processing the fourth message segment.

16. The network unit of claim 10, wherein the message segments conform to an ordering transport protocol.

17. The network unit of claim 10, wherein the controller is further configured to discard a message associated with the received message segments if one of the plurality of digital signatures is detected by the DFA in at least one of the second message segment and the third message segment.

* * * * *